(12) United States Patent
Natsuki

(10) Patent No.: US 11,234,303 B2
(45) Date of Patent: Jan. 25, 2022

(54) VEHICULAR LIGHTING CONTROL DEVICE

(71) Applicant: SHINDENGEN ELECTRIC MANUFACTURING CO., LTD., Tokyo (JP)

(72) Inventor: Ryo Natsuki, Saitama (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/957,688

(22) PCT Filed: Jan. 16, 2018

(86) PCT No.: PCT/JP2018/000973
§ 371 (c)(1),
(2) Date: Jun. 24, 2020

(87) PCT Pub. No.: WO2019/142234
PCT Pub. Date: Jul. 25, 2019

(65) Prior Publication Data
US 2020/0367344 A1 Nov. 19, 2020

(51) Int. Cl.
*H05B 45/32* (2020.01)
*H05B 47/10* (2020.01)
(Continued)

(52) U.S. Cl.
CPC ........... *H05B 45/325* (2020.01); *H05B 47/10* (2020.01); *H05B 47/16* (2020.01)

(58) Field of Classification Search
CPC ...... H05B 45/30; H05B 45/305; H05B 45/31; H05B 45/32; H05B 45/325; H05B 47/10; H05B 47/16
See application file for complete search history.

(56) References Cited

U.S. PATENT DOCUMENTS

| 7,919,925 B2 * | 4/2011 | Ito ........................ H05B 45/385 |
| | | 315/82 |
| 2014/0203705 A1 | 7/2014 | Ohmura et al. |
| 2014/0285098 A1 * | 9/2014 | Boezen .................. H05B 45/37 |
| | | 315/193 |

FOREIGN PATENT DOCUMENTS

| DE | 102010046795 A1 | 3/2012 |
| JP | 2003309968 A | 10/2003 |

(Continued)

OTHER PUBLICATIONS

International Search Report for international application No. PCT/JP2018/000973, dated Mar. 20, 2018, and its English translation provided by WIPO.

(Continued)

*Primary Examiner* — Jimmy T Vu
(74) *Attorney, Agent, or Firm* — Ladas & Parry, LLP

(57) ABSTRACT

A vehicle lighting control device that controls lighting of a plurality of LED units mounted on a vehicle including an electronic device, the vehicle lighting control device including: a plurality of converters that are connected to a power supply and transform a power supply voltage supplied from the power supply; an output circuit that is connected to an output of the converter and outputs a drive signal to the LED unit with a voltage transformed by the converter; and a processor that generates a plurality of switching signals and outputs the generated switching signals to the corresponding converters, wherein at least one of a rising timing and a falling timing differs between the plurality of switching signals output to the plurality of converters.

9 Claims, 8 Drawing Sheets

(51) Int. Cl.
*H05B 45/325* (2020.01)
*H05B 47/16* (2020.01)

(56) References Cited

FOREIGN PATENT DOCUMENTS

| | | | |
|---|---|---|---|
| JP | 2014140266 A | 7/2014 | |
| JP | 2016131414 A | 7/2016 | |
| WO | WO-2015186404 A1 * | 12/2015 | .......... H02M 3/1584 |

OTHER PUBLICATIONS

Written Opinion of the International Searching Authority for international application No. PCT/JP2018/000973, dated Mar. 20, 2018 and English translation provided by Google Translate.
International Preliminary Report on Patentability for international application No. PCT/JP2018/000973, dated Oct. 120, 2018 and English translation provided by Google Translate.
First Office Action for Japanese Patent Application No. 2019-506738, dated Dec. 3, 2019 and English translation provided by the Japanese Patent Office.
Notice of Allowance for Japanese Patent Application No. 2019-506738, dated Apr. 7, 2020 and English translation provided by the Japanese Patent Office.
Office Action from DE app. No. 112018006871.4, dated Oct. 15, 2020, with English translation from German Patent and Trademark Office.

* cited by examiner

VEHICULAR LIGHTING CONTROL DEVICE

CROSS-REFERENCE TO RELATED APPLICATIONS

The present application is the U.S. national phase of PCT Application No. PCT/JP2018/000973 filed on Jan. 16, 2018, the disclosure of which is incorporated herein by reference in its entirety

TECHNICAL FIELD

The present invention relates to a vehicle lighting control device.

BACKGROUND ART

Conventionally, in drive of a turn signal (hereinafter, referred to as a winker) of a vehicle (for example, a motorcycle or an automobile), when a light source is an LED element, it is known that a drive circuit equipped with a converter is used. Since this converter transforms a power supply voltage by switching a switch at a switching frequency, in a radio band, a harmonic component of the switching frequency is superimposed as noise (hereinafter referred to as harmonic noise) on a radio sound. As a technique for reducing the harmonic noise, for example, Patent Literature 1 (JP 2016-131414 A) discloses a switching power supply that reduces the harmonic noise.

SUMMARY OF INVENTION

Technical Problem

However, when the converter is mounted on each of front, rear, left, and right four lights provided in the vehicle, there is a problem that the harmonic noise radiated from the converter is superimposed, and the superimposed harmonic noise is superimposed as noise on a signal of an electronic device mounted on the vehicle. In particular, there is a problem that an influence of the noise in the radio band increases, and the audibility of the radio deteriorates. At this time, compared with during turn signal operation in which two lights on one of the left and right sides blink, the audibility further deteriorates during hazard operation in which four lights on both the left and right sides blink. There is also a problem that the harmonic noise is superimposed as noise on a communication signal in the vehicle and affects communication. To solve this problem, it is conceivable to add a noise reduction circuit to reduce the harmonic noise. However, if the noise reduction circuit is added, there is a problem that an outer shape of a product becomes large and the cost increases.

The present invention has been made in view of such a point, and a vehicle lighting control device capable of reducing harmonic noise radiated from a plurality of converters and superimposed without adding a noise reduction circuit is provided.

Solution to Problem

[Concept 1]

A vehicle lighting control device according to a first concept of the present invention that controls lighting of a plurality of LED units mounted on a vehicle including an electronic device, the vehicle lighting control device comprising: a plurality of converters that are connected to a power supply and transform a power supply voltage supplied from the power supply; an output circuit that is connected to an output of the converter and outputs a drive signal to the LED unit with a voltage transformed by the converter; and a processor that generates a plurality of switching signals and outputs the generated switching signals to the corresponding converters, wherein at least one of a rising timing and a falling timing differs between the plurality of switching signals output to the plurality of converters.

[Concept 2]

The vehicle lighting control device according to the first concept of the present invention, wherein at least one of the rising timing and the falling timing is aligned between the plurality of drive signals output to the LED unit.

[Concept 3]

The vehicle lighting control device according to the first or the second concept of the present invention, wherein the plurality of switching signals have identical frequency and duty ratio, and the plurality of switching signals have different phases.

[Concept 4]

The vehicle lighting control device according to any one of the first to third concept of the present invention, wherein there are four of the LED units, there are four of the converters, and all four of the switching signals have different rising timings and falling timings.

[Concept 5]

The vehicle lighting control device according to the first or second concept of the present invention, wherein the plurality of switching signals have different frequencies or duty ratios.

[Concept 6]

The vehicle lighting control device according to any one of the first to fifth concept of the present invention, wherein the electronic device is a radio, and the frequencies of the plurality of switching signals are included in a radio frequency band.

Advantageous Effects of Invention

Therefore, as for the vehicle lighting control device according to the present invention, by making the rising timing or the falling timing different between the plurality of switching signals, even if radiated noises from the plurality of converters are superimposed, the peak of the radiated noise after the superimposition is reduced, and therefore, harmonic noise can be reduced. Thus, the harmonic noise radiated from the plurality of converters and superimposed can be reduced without adding a noise reduction circuit. In addition, the harmonic noise radiated from the plurality of converters and superimposed can be reduced without taking any special noise countermeasures in the vehicle.

DESCRIPTION OF EMBODIMENTS

Hereinafter, examples of the present invention will be described with reference to the drawings.

Embodiment (Configuration)

Figure 2:
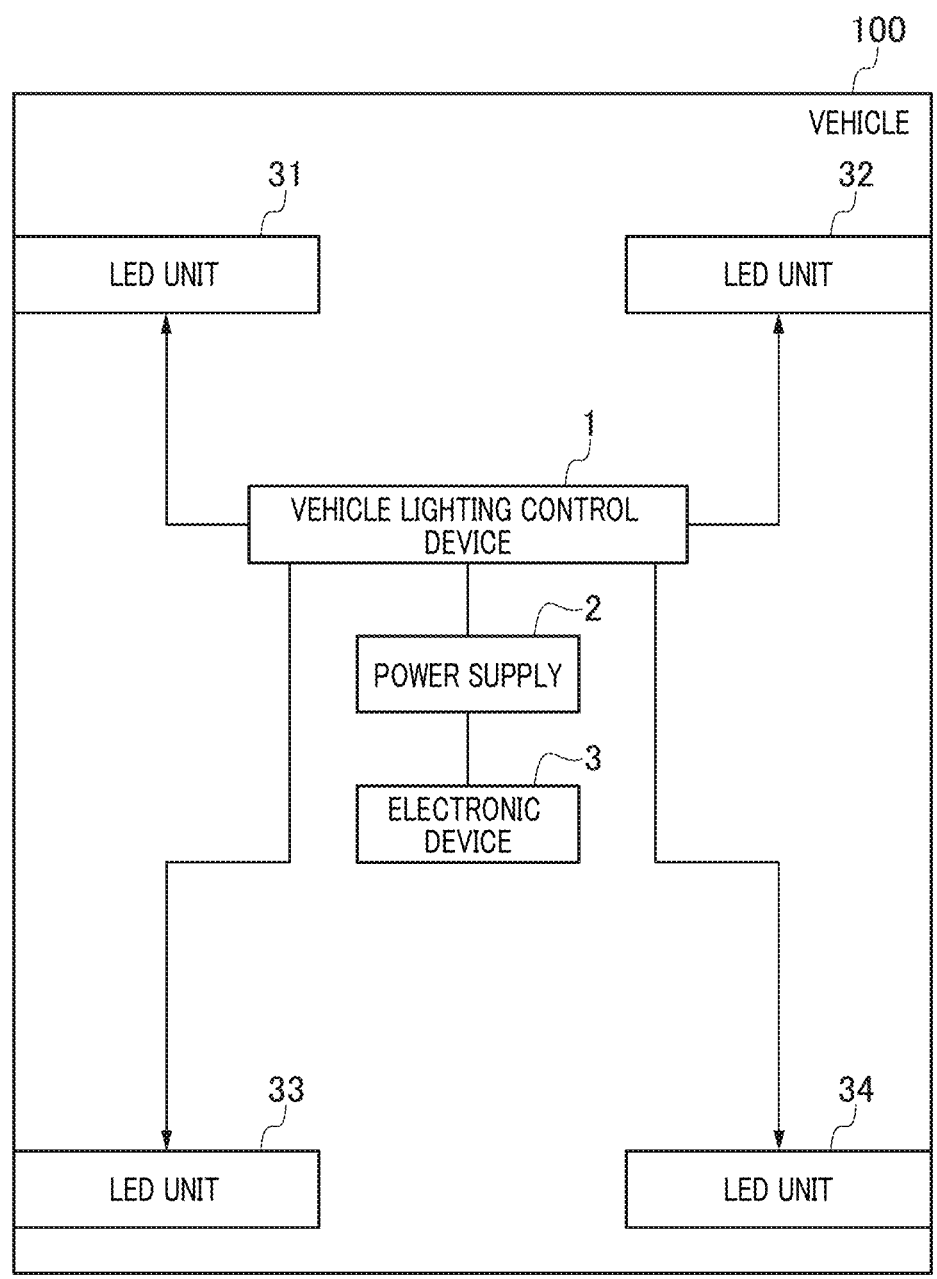
FIG. 2 is a view illustrating an example of a configuration of a vehicle according to the embodiment which is an aspect of the present invention.

As shown in FIG. 2, a vehicle 100 according to the present embodiment includes an LED unit 31 installed on the left front of the vehicle 100 and functioning as a winker, an LED unit 32 installed on the right front of the vehicle 100 and functioning as a winker, an LED unit 33 installed on the left rear of the vehicle 100 and functioning as a turn signal, and an LED unit 34 installed on the right rear of the vehicle 100 and functioning as a turn signal. The vehicle 100 may be a motorcycle or an automobile. In the present embodiment, as an example, the vehicle will be described as a motorcycle.

Further, the vehicle 100 according to the present embodiment includes a vehicle lighting control device 1 connected to the LED units 31 to 34, a power supply 2 connected to the vehicle lighting control device 1, and an electronic device 3 connected to the power supply 2. The vehicle lighting control device 1 controls lighting of the LED units 31 to 34 using a power supply voltage supplied from the power supply 2. The electronic device 3 operates using the power supply voltage supplied from the power supply 2. The electronic device 3 according to the present embodiment will be described below as a radio as an example.

Figure 1:
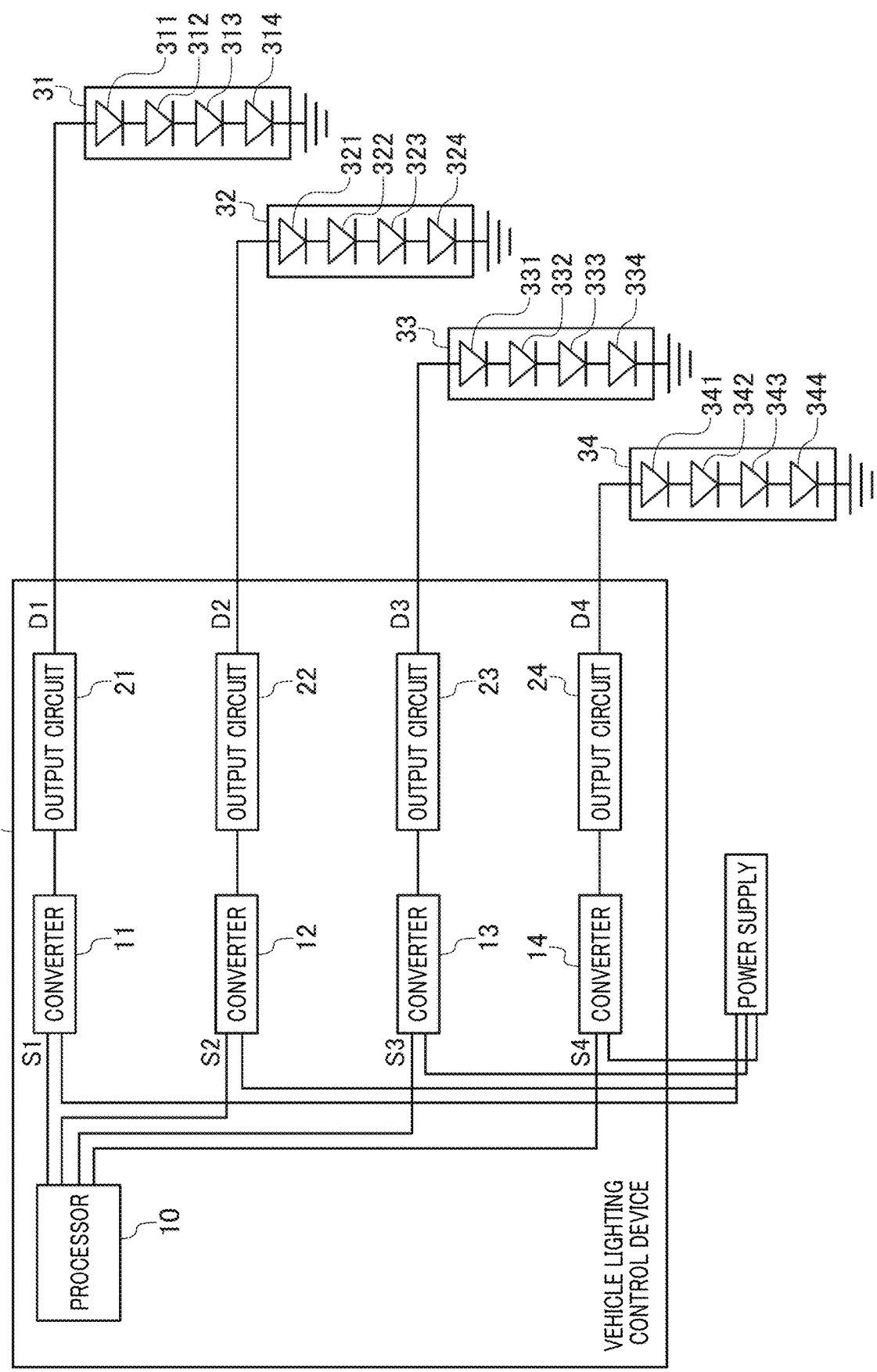
FIG. 1 is a view illustrating an example of a configuration of a vehicle lighting control device according to an embodiment which is an aspect of the present invention.

As shown in FIG. 1, the LED unit 31 has, for example, four LED elements 311 to 314 connected in series. Similarly, the LED unit 32 has, for example, four LED elements 321 to 324 connected in series. Similarly, the LED unit 33 has, for example, four LED elements 331 to 334 connected in series. Similarly, the LED unit 34 has, for example, four LED elements 341 to 344 connected in series.

As shown in FIG. 1, the vehicle lighting control device 1 includes a processor 10, and converters 11, 12, 13, and 14 connected to the processor 10. The converters 11 and 14 are also connected to the power supply 2. Further, the vehicle lighting control device 1 includes an output circuit 21 connected to the converter 11, an output circuit 22 connected to the converter 12, an output circuit 23 connected to the converter 13, and an output circuit 24 connected to the converter 14.

The processor 10 generates a plurality of switching signals S1 to S4, and outputs the generated switching signals S1 to S4 to the corresponding converters 11 to 14, respectively. The frequencies of the switching signals S1 to S4 according to the present embodiment are included in a radio frequency band as an example.

The converters 11 to 14 are connected to the power supply 2 and transform the power supply voltage supplied from the power supply 2. In the present embodiment, as one example thereof, the converters 11 to 14 increase the power supply voltage supplied from the power supply 2 to a set voltage. Here, the set voltage is a voltage higher than a minimum voltage required to drive the four LED elements connected in series.

The output circuit 21 is connected to an output of the converter 11, and outputs a drive signal D1 to the LED unit 31 with the voltage transformed by the converter 11. Similarly, the output circuit 22 is connected to an output of the converter 12, and outputs a drive signal D2 to the LED unit 32 with the voltage transformed by the converter 12. Similarly, the output circuit 23 is connected to an output of the converter 13 and outputs a drive signal D3 to the LED unit 33 with the voltage transformed by the converter 13. Similarly, the output circuit 24 is connected to an output of the converter 14, and outputs a drive signal D4 to the LED unit 34 with the voltage transformed by the converter 14.

At least a rising timing or a falling timing differs between the switching signals S1 to S4 output to the converters 11 to 14. In the present embodiment, as one example thereof, both the rising timing and the falling timing differ between the switching signals S1 to S4. That is, the four switching signals S1 to S4 have different rising timings and falling timings.

Example 1

Figure 3:
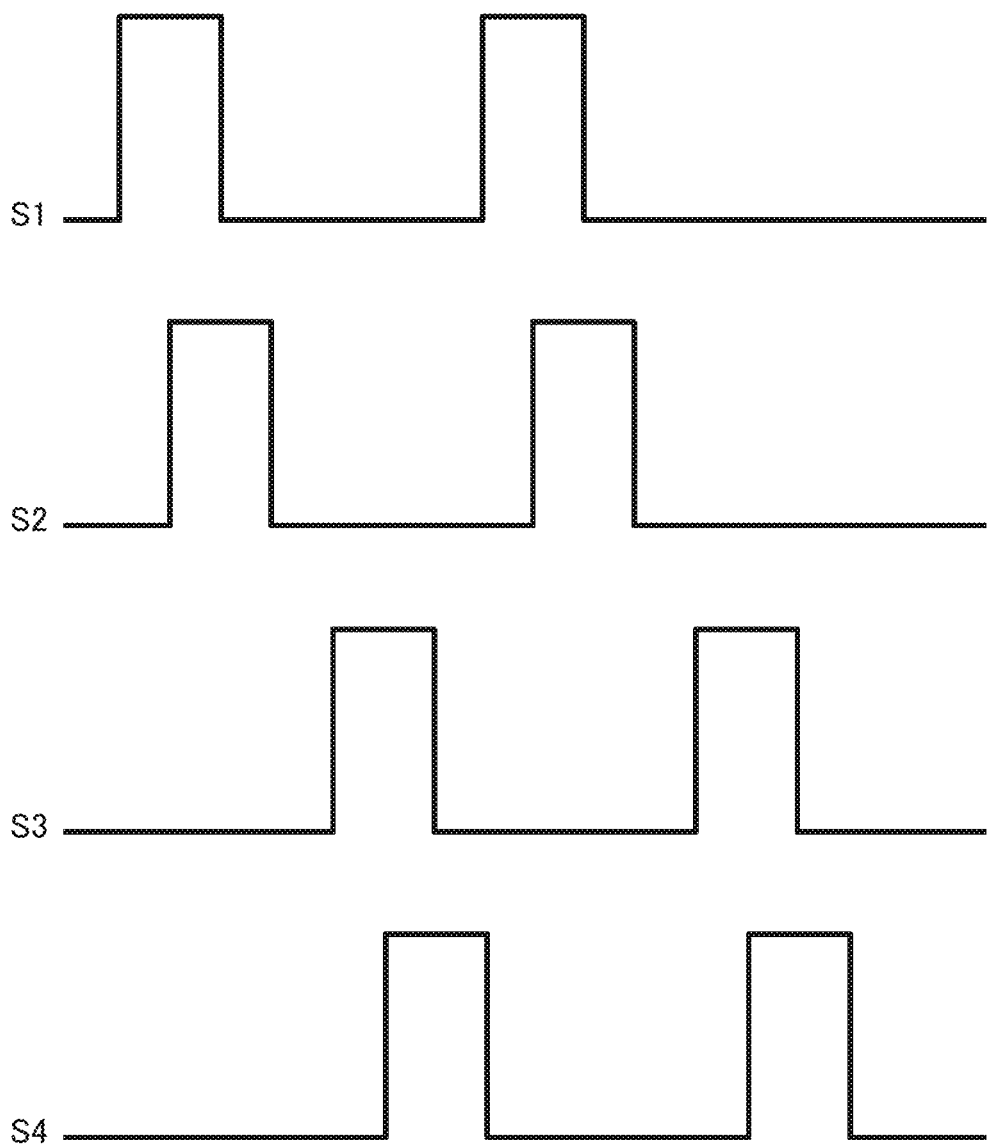
FIG. 3 is a view illustrating an example of a waveform of a switching signal according to Example 1.

In Example 1 according to the present embodiment, as shown in FIG. 3, the plurality of switching signals S1 to S4 have the same frequency and duty ratio and have different phases.

On the other hand, at least one of the rising timing and the falling timing is aligned between the plurality of drive signals D1 to D4 output to the LED units 31 to 34. In the present embodiment, as one example thereof, as shown in FIG. 4, both the rising timing and the falling timing are aligned between the plurality of drive signals D1 to D4.

Figure 4:
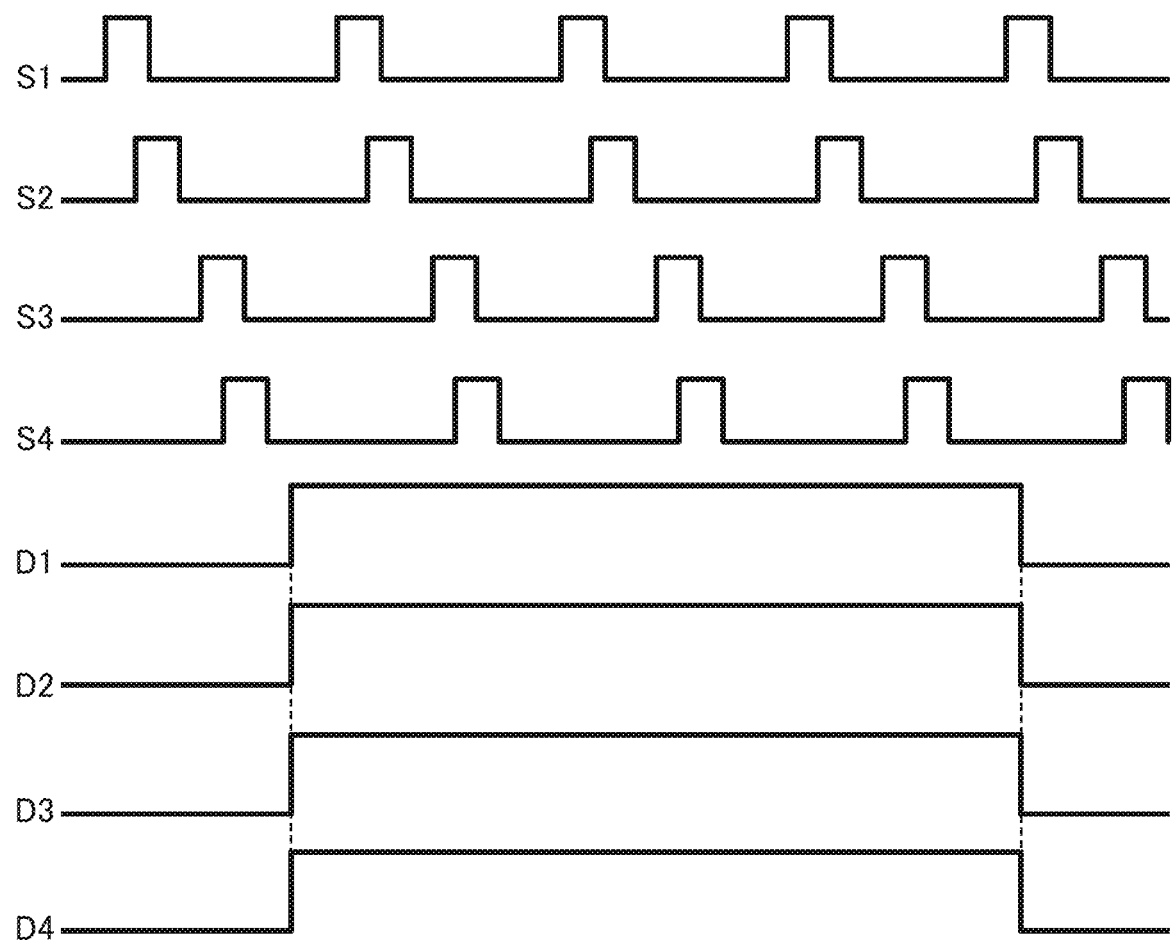
FIG. 4 is a view illustrating an example of the switching signal and a drive signal according to Example 1 during hazard operation.

As shown in FIG. 4, when the right and left four lights blink at the same time due to a hazard, both the rising timing and the falling timing are aligned between the drive signals D1 to D4. As shown in FIG. 4, the frequencies of the drive signals D1 to D4 are lower than the frequencies of the switching signals S1 to S4.

Figure 5:
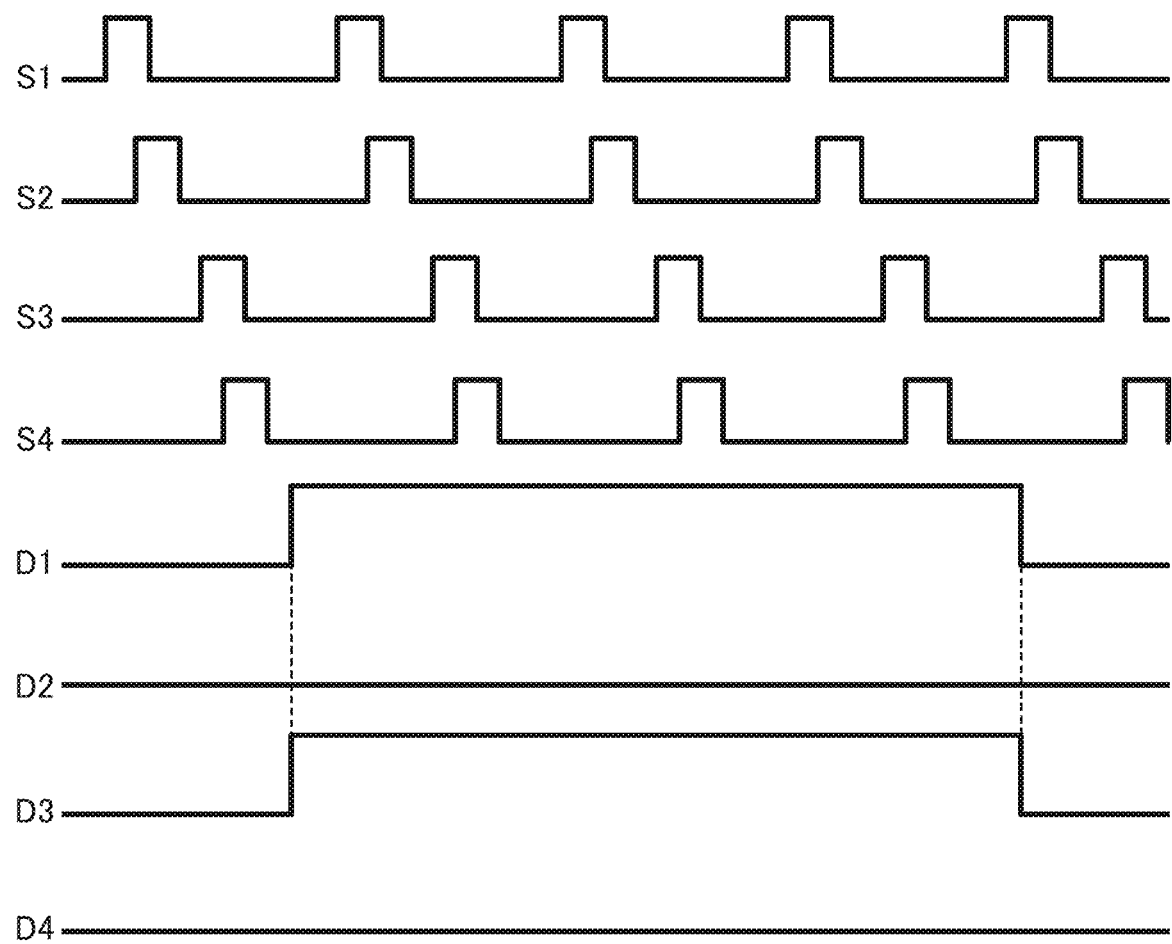
FIG. 5 is a view illustrating an example of the switching signal and the drive signal according to Example 1 during left turn signal operation.

On the other hand, during left turn signal operation, as shown in FIG. 5, only the drive signals D1 and D3 for driving the LED units 31 and 33 installed respectively on the left front and left rear of the vehicle 100 are turned on and off. As a result, only the left LED units 31 and 33 of the vehicle 100 blink at the same time. In this case, both the rising timing and the falling timing are aligned between the drive signal D1 and the drive signal D3.

Figure 6:
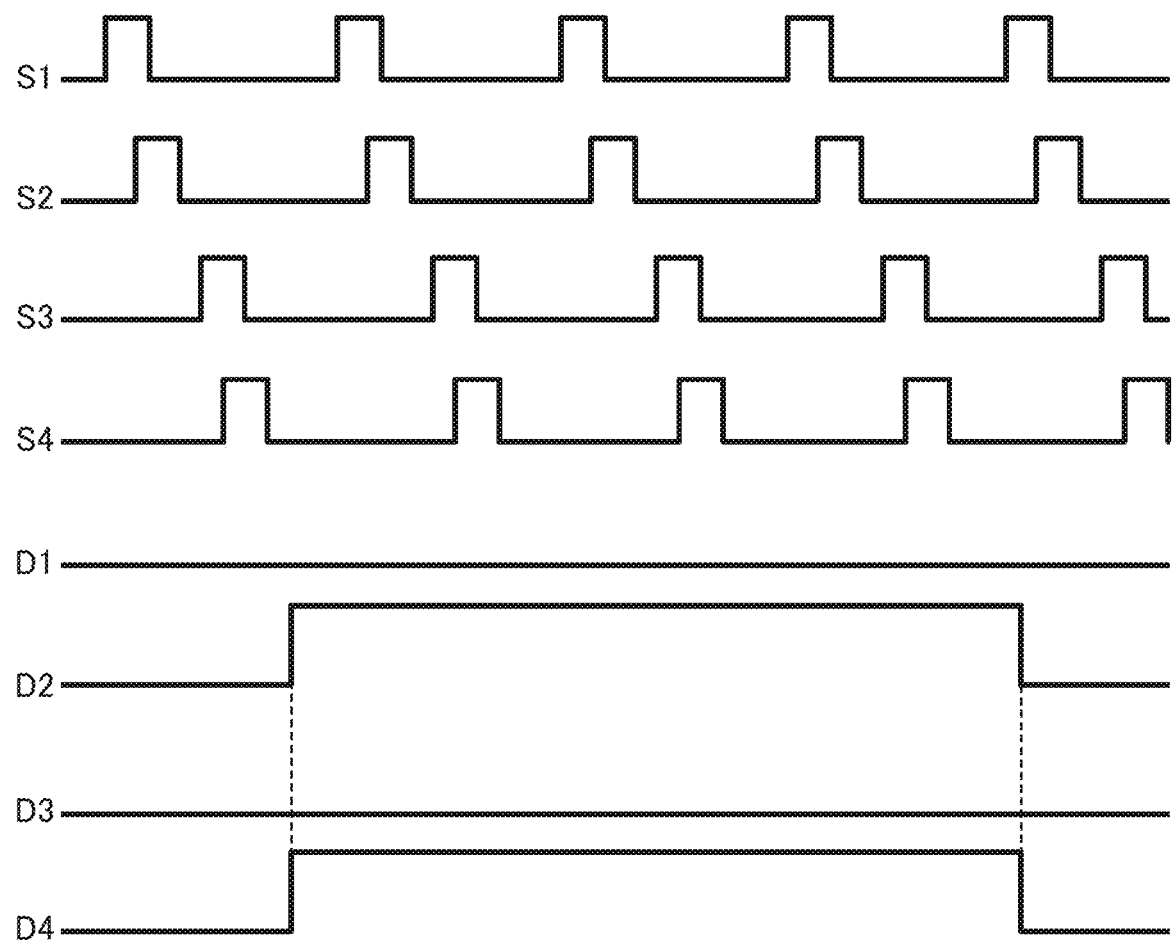
FIG. 6 is a view illustrating an example of the switching signal and the drive signal according to Example 1 during right turn signal operation.

On the other hand, during right turn signal operation, as shown in FIG. 6, only the drive signals D2 and D4 for driving the LED units 32 and 34 installed respectively on the right front and right rear of the vehicle 100 are turned on and off. As a result, only the right LED units 32 and 34 of the vehicle 100 blink at the same time. In this case, both the rising timing and the falling timing are aligned between the drive signal D2 and the drive signal D4.

As described above, the vehicle lighting control device 1 according to the present embodiment controls the lighting of the plurality of LED units 31 to 34 mounted on the vehicle 100 including the electronic device 3. The vehicle lighting control device 1 includes the plurality of converters 11 to 14 connected to the power supply 2 and transforming the power supply voltage supplied from the power supply 2. Further, the vehicle lighting control device 1 includes the output circuits 21 to 24 connected to the outputs of the converters 11 to 14 and outputting the drive signal to the LED unit with the voltage transformed by the converters 11 to 14. Further, the vehicle lighting control device 1 includes the processor 10 generating the plurality of switching signals S1 to S4 and outputting the generated switching signals S1 to S4 to the corresponding converters 11 to 14, respectively. At least one of the rising timing and the falling timing differs between the plurality of switching signals S1 to S4 output to the plurality of converters 11 to 14.

With this configuration, by making the rising timing or the falling timing different between the plurality of switching signals S1 to S4, even if radiated noises from the plurality of converters are superimposed, the peak of the radiated noise after the superimposition is reduced, and therefore, harmonic noise can be reduced. Thus, the harmonic noise radiated from the plurality of converters 11 to 14 and superimposed can be reduced without adding a noise reduction circuit.

As in the present embodiment, when the electronic device 3 included in the vehicle 100 is a radio and the frequencies of the plurality of switching signals are included in the radio frequency band, it is possible to reduce the peak of harmonic noise in a radio band, and therefore, the audibility of the radio can be prevented from deteriorating. In addition, the harmonic noise radiated from the plurality of converters 11 to 14 and superimposed can be reduced without taking any special noise countermeasures in the vehicle.

In Example 1, the plurality of switching signals S1 to S4 have the same frequency and duty ratio and have different phases. With this configuration, since the frequency and the duty ratio are the same, it is possible prevent a lighting state from differing between the LED units 31 to 34.

Example 2

Figure 7:
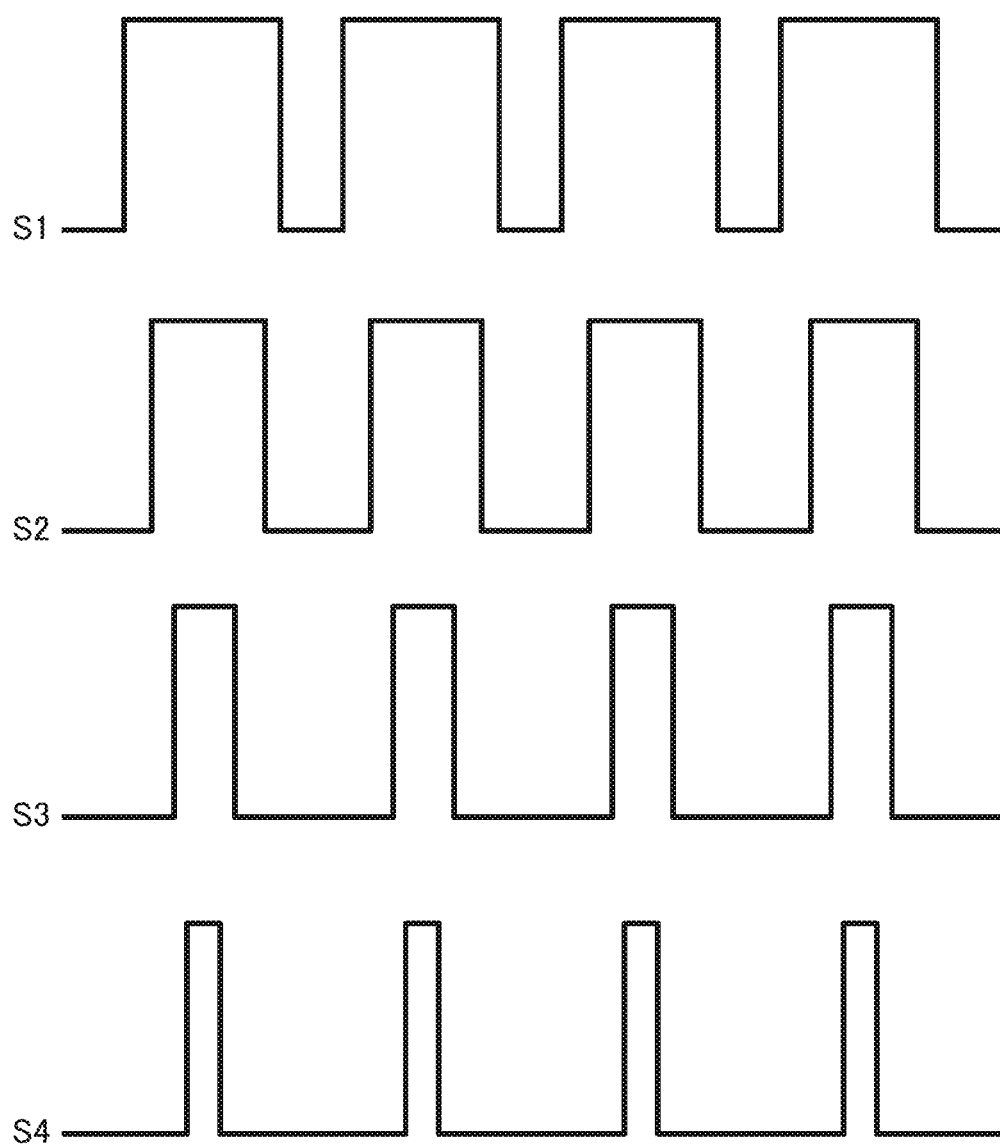
FIG. 7 is a view illustrating an example of the waveform of the switching signal according to Example 2.

Next, Example 2 according to the present embodiment will be described. In Example 2 according to the present embodiment, as shown in FIG. 7, the plurality of switching signals S1 to S4 have different duty ratios. Thereby, both the rising timing and the falling timing differ between the switching signals S1 to S4. With this configuration, even if radiated noises from the plurality of converters are superimposed, the peak of the radiated noise after the superimposition is reduced, and therefore, harmonic noise can be reduced. Thus, the harmonic noise radiated from the plurality of converters 11 to 14 and superimposed can be reduced without adding a noise reduction circuit.

Although it is assumed that both the rising timing and the falling timing differ between the switching signals S1 to S4, the present invention is not limited thereto, and only one of the rising timing and the falling timing may differ between the switching signals S1 to S4.

Example 3

Figure 8:
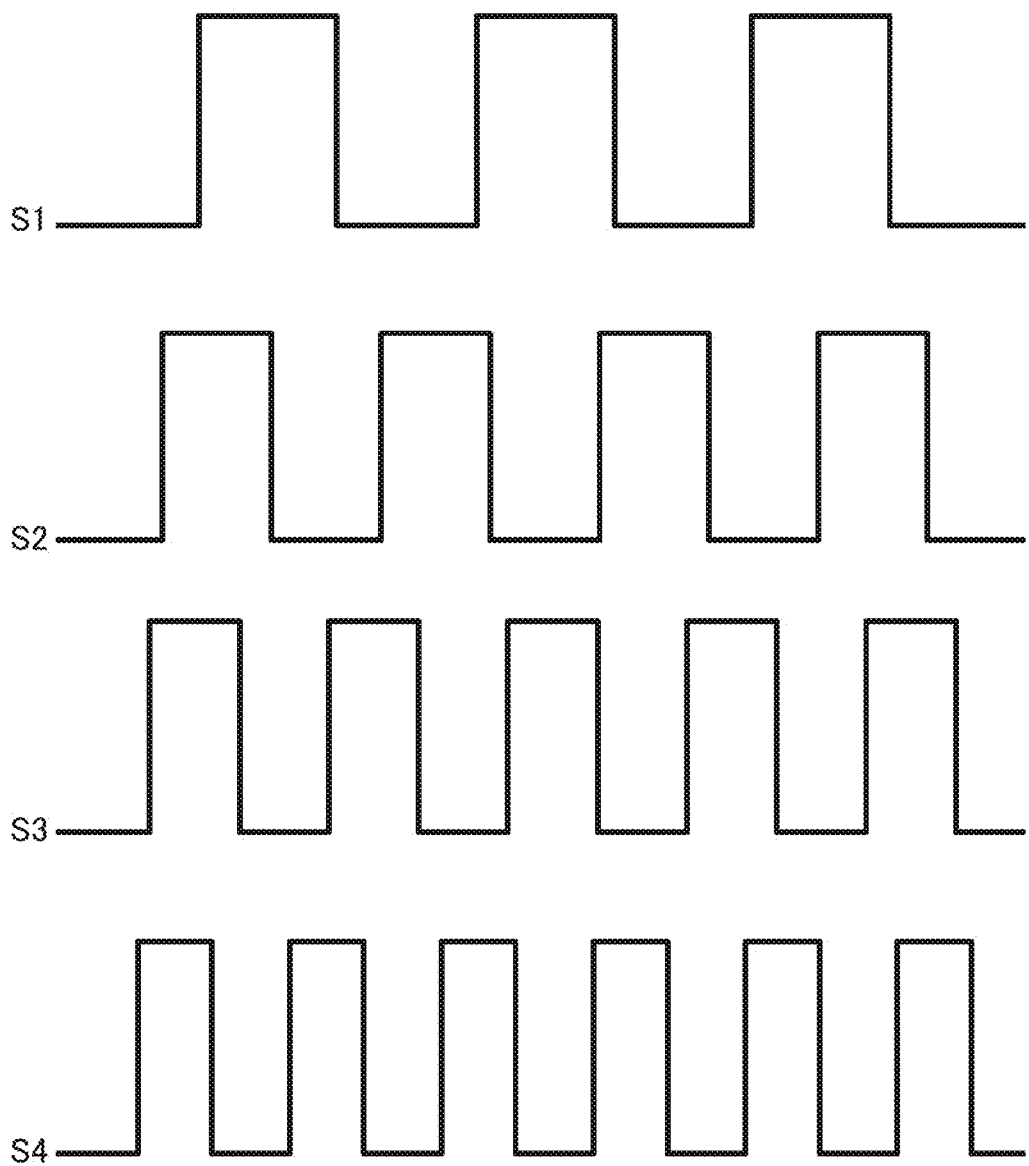
FIG. 8 is a view illustrating an example of the waveform of the switching signal according to Example 3.

Next, Example 2 according to the present embodiment will be described. In Example 3 according to the present embodiment, as shown in FIG. 8, the plurality of switching signals S1 to S4 have different frequencies. Thereby, both the rising timing and the falling timing differ between the switching signals S1 to S4. With this configuration, even if radiated noises from the plurality of converters are superimposed, the peak of the radiated noise after the superimposition is reduced, and therefore, harmonic noise can be reduced. Thus, the harmonic noise radiated from the plurality of converters 11 to 14 and superimposed can be reduced without adding a noise reduction circuit.

Although it is assumed that both the rising timing and the falling timing differ between the switching signals S1 to S4, the present invention is not limited thereto, and only one of the rising timing and the falling timing may differ between the switching signals S1 to S4.

Although the LED units 31 to 34 according to the present embodiment have four LED elements, they may have one to three LED elements, or may have five or more LED elements.

The foregoing descriptions of the respective embodiments and the disclosure of the drawings are nothing more than one example for describing the present invention recited in the claims. The present invention recited in the claims shall not be limited by the foregoing descriptions of the respective embodiments and the disclosure of the drawings. In addition, the descriptions of the claims at the beginning of the application are merely examples, and the descriptions of the claims can be also appropriately chanced based on the descriptions of the specification, the drawings, and the like.

REFERENCE SIGNS LIST

1 Vehicle lighting control device
10 Processor
100 Vehicle
11, 12, 13, 14 Converter
2 Power supply
21, 22, 23, 24 Output circuit
3 Electronic device
31, 32, 33, 34 LED unit
311, 312, 313, 314, 321, 322, 323, 324, 331, 332, 333, 334, 341, 342, 343, 344 LED element

The invention claimed is:

1. A vehicle lighting control device that controls lighting of a plurality of LED units mounted on a vehicle including an electronic device, the vehicle lighting control device comprising:
 a plurality of converters that are connected to a power supply and transform a power supply voltage supplied from the power supply;
 an output circuit that is connected to an output of the converter and outputs a drive signal to the LED unit with a voltage transformed by the converter; and
 a processor that generates a plurality of switching signals and outputs the generated switching signals to the corresponding converters,
 wherein at least one of a rising timing and a falling timing differs between the plurality of switching signals output to the plurality of converters;
 wherein there are four of the LED units,
 there are four of the converters, and
 all four of the switching signals have different rising timings and falling timings.

2. The vehicle lighting control device according to claim 1,
 wherein at least one of the rising timing and the falling timing is aligned between the plurality of drive signals output to the LED unit.

3. The vehicle lighting control device according to claim 1,
 wherein the plurality of switching signals have identical frequency and duty ratio, and
 the plurality of switching signals have different phases.

4. The vehicle lighting control device according to claim 1,
 wherein the plurality of switching signals have different frequencies or duty ratios.

5. The vehicle lighting control device according to claim 1,
wherein the electronic device is a radio, and
the frequencies of the plurality of switching signals are included in a radio frequency band.

6. A vehicle lighting control device that controls lighting of a plurality of LED units mounted on a vehicle including an electronic device, the vehicle lighting control device comprising:
a plurality of converters that are connected to a power supply and transform a power supply voltage supplied from the power supply;
an output circuit that is connected to an output of the converter and outputs a drive signal to the LED unit with a voltage transformed by the converter; and
a processor that generates a plurality of switching signals and outputs the generated switching signals to the corresponding converters,
wherein at least one of a rising timing and a falling timing differs between the plurality of switching signals output to the plurality of converters;
wherein the electronic device is a radio, and
the frequencies of the plurality of switching signals are included in a radio frequency band.

7. The vehicle lighting control device according to claim 6,
wherein at least one of the rising timing and the falling timing is aligned between the plurality of drive signals output to the LED unit.

8. The vehicle lighting control device according to claim 6,
wherein the plurality of switching signals have identical frequency and duty ratio, and
the plurality of switching signals have different phases.

9. The vehicle lighting control device according to claim 6,
wherein the plurality of switching signals have different frequencies or duty ratios.

* * * * *